No. 751,075. PATENTED FEB. 2, 1904.
W. A. HOSKINS.
WHEEL.
APPLICATION FILED OCT. 21, 1903.
NO MODEL.
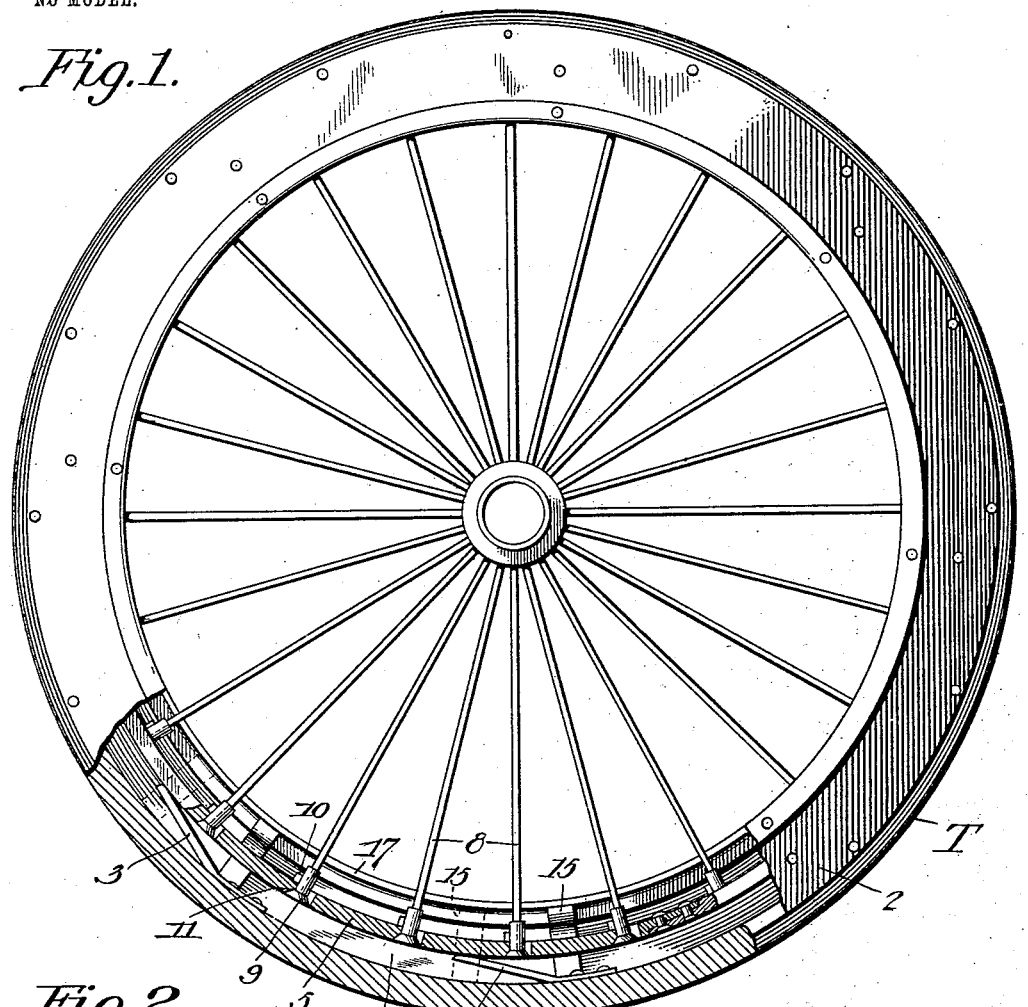
Fig.1.
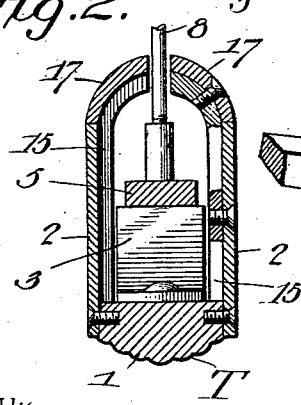
Fig.2.
Fig.3.
W. A. Hoskins, Inventor.
Witnesses
by C. A. Snow & Co.
Attorneys
THE NORRIS PETERS CO., PHOTO-LITHO., WASHINGTON, D. C.

No. 751,075. Patented February 2, 1904.

UNITED STATES PATENT OFFICE.

WILLIAM A. HOSKINS, OF CHARLESTON, MISSOURI.

WHEEL.

SPECIFICATION forming part of Letters Patent No. 751,075, dated February 2, 1904.

Application filed October 21, 1903. Serial No. 177,926. (No model.)

*To all whom it may concern:*

Be it known that I, WILLIAM A. HOSKINS, a citizen of the United States, residing at Charleston, in the county of Mississippi and State of Missouri, have invented a new and useful Wheel, of which the following is a specification.

This invention relates to vehicle-wheels, and more especially to wheels of the type in which the tire is spring-supported upon the felly.

The object of the invention is to provide an improved wheel of the type specified in which the springs which form the yielding connection between the felly and the tire are directly attached to the tire and merely have their ends in contact with the felly, in which means is provided for excluding dirt and mud from entrance into the space between the felly and the tire and in which improved means are provided for securing the felly in proper relation.

With the objects above mentioned and others in view, which will appear when the invention is more fully disclosed, the same consists in the construction and combination of parts of a vehicle-wheel hereinafter fully disclosed, illustrated in the accompanying drawings, and having the novel features specifically pointed out in the appended claims.

In the drawings, Figure 1 is a view in side elevation of a complete wheel, part being broken away to show the internal arrangement of the supporting-springs. Fig. 2 is a transverse section through the tire and felly, showing the mode of securing the felly in the tire and the way of attaching the guard-strips. Fig. 3 is a view in perspective of the felly removed from the tire.

Referring to the drawings, in which corresponding parts are designated by similar characters of reference throughout, T designates the tire of the wheel, which consists, preferably, of a tread 1 and parallel side portions 2 spaced apart, as shown, to form a chamber for the reception of the felly. The tire will ordinarily be formed of metal, as iron or steel, of suitable thickness, and on the interior of the tread 1, which may be formed integral with the sides or attached thereto in any preferred manner, the supporting-springs 3 are rigidly attached at short intervals. Each supporting-spring 3 is preferably of the form shown and is rigidly attached to the inner face of the tread 1 of the tire at a small acute angle thereto, so as to give sufficient cushion for the felly and yet leave sufficient space between the sides of the tire to guide the movement of the felly. The felly consists, preferably, of a single strip of metal 5 bent into a hoop and having the ends scarfed, as shown at 6, and provided with shoulders 7 to form a lap-joint of sufficient strength. The ends of the felly are held together by means of small screws, and spokes 8 are detachably connected with the felly at intervals throughout its length. The spokes 8 are preferably provided with heads 9, which are disposed on the outside of the felly, and with lugs 10, which serve when the spokes are given a quarter-turn after insertion to prevent retraction of the spokes through the openings 11 in the felly. The openings 11 are preferably irregular in shape, consisting of a circular main portion and a lateral notch for the passage of the lugs 10 of the spokes.

The felly is held within the tire by means of curved retaining-lugs 15, which are attached by screws to the interior of the tire, as shown. The lugs 15 are of such length that when in position the curved ends thereof extend beyond the inner margin of the sides 2 of the tire and so overhang the felly, which rests upon the springs between the sides. These lugs serve not only to maintain the felly in position, but they also afford a support for the guard pieces or shields 17. The shields 17 are annular in form and present an inner convex and an outer concave surface, the latter being adapted to conform to the curvature of the ends of the lugs 15. When the felly and spokes have been positioned, the guard-strips are attached to the lugs 15 by means of screws and when so attached fit close to the spokes and present only a very narrow opening, so that very little dirt can enter the space between the sides 2 of the tire.

In order to introduce the felly into the space between the sides of the tire, it is necessary to remove the screws connected with the lapped ends of the felly and lap the ends sufficiently to reduce the diameter of the felly until it may be passed through the ring formed by the tire and brought into position within the tire. The felly will then be allowed to expand and when expanded the ends will be secured by screws, as usual. The spokes will then be tightened to place the felly under tension, and the guard-strips will be secured in position upon the lugs 15, thus completing the wheel.

The wheel constructed in the manner described is well adapted for use upon light vehicles of all kinds, such as buggies, runabouts, bicycles, and the like, and affords a perfect substitute for the rubber-tire wheel. The cost of the rubber tire is much greater than the tire of my improved wheel and is liable, if of the pneumatic type, to puncture, which will render it unfit for use until repaired, while the spring-supported tire of the improved wheel gives all necessary resiliency and at the same time is both cheaper and more durable than the rubber tire.

Having thus described the construction and advantages of my invention, what I claim, and desire to secure by Letters Patent, is—

1. In a vehicle-wheel, the combination of a channeled tire, springs rigidly attached to said tire within the channel, a felly disposed within the channel and resting on said springs, and curved guiding-lugs fixed within said channeled tire and having their curved ends extended around said felly to retain it in position.

2. The combination in a vehicle-wheel of a channeled tire, springs rigidly secured within said channel, a felly also disposed within said channel and resting on said springs, and curved retaining-lugs disposed within said channel to prevent the removal of said felly, and guard members detachably mounted on said lugs.

In testimony that I claim the foregoing as my own I have hereto affixed my signature in the presence of two witnesses.

WILLIAM A. HOSKINS.

Witnesses:
FRANK DUGAN,
J. HANDY MOORE.